US008613049B2

(12) United States Patent
Yasuda

(10) Patent No.: US 8,613,049 B2
(45) Date of Patent: Dec. 17, 2013

(54) NETWORK SYSTEM, ITS CONTROL METHOD, AND PROGRAM

(75) Inventor: Masataka Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1576 days.

(21) Appl. No.: 11/570,741

(22) PCT Filed: Oct. 27, 2005

(86) PCT No.: PCT/JP2005/020164
§ 371 (c)(1),
(2), (4) Date: Dec. 15, 2006

(87) PCT Pub. No.: WO2006/046767
PCT Pub. Date: May 4, 2006

(65) Prior Publication Data
US 2009/0158410 A1    Jun. 18, 2009

(30) Foreign Application Priority Data

Oct. 28, 2004 (JP) .................. 2004-314215

(51) Int. Cl.
*G06F 7/04* (2006.01)
*G06F 21/00* (2013.01)
*G08B 29/00* (2006.01)
*G08B 21/00* (2006.01)

(52) U.S. Cl.
USPC .................. 726/4; 726/5; 713/183; 713/185; 340/5.1; 340/5.2; 340/5.21; 340/5.23; 340/5.3; 340/5.31; 340/5.6; 340/5.7; 340/5.8; 340/5.81

(58) Field of Classification Search
USPC ....... 709/203, 227; 370/401; 455/432; 726/4, 726/5; 713/183, 185; 340/5.1, 5.2, 5.21, 340/5.23, 5.3, 5.31, 5.6, 5.7, 5.8, 5.81
See application file for complete search history.

(56) References Cited

U.S. PATENT DOCUMENTS 6,823,459 B1    11/2004  Horikoshi et al. ............ 713/200
6,992,985 B1*    1/2006  Das .............................. 370/252

(Continued)

FOREIGN PATENT DOCUMENTS

JP    2000-259571    9/2000
JP    2002-232449    8/2002

(Continued)

OTHER PUBLICATIONS

May 10, 2007 Notification Concerning Transmittal of International Preliminary Report on Patentability (with Feb. 7, 2006 Written Opinion) in International Application No. PCT/JP2005/020164.

*Primary Examiner* — Aravind Moorthy
(74) *Attorney, Agent, or Firm* — Fitzpatrick, Cella, Harper & Scinto

(57) ABSTRACT

The invention provides a network system which can prevent an illegal access to a network or the like set in a specific area and improve security of the network. The network system permits the entering of the user into a security area in accordance with security information (user ID) read out of a contactless IC in a carrying ID card by an entering/leaving room managing apparatus and registers an MAC address of a notebook computer carried by the user when he enters the security area to a managing server as ID information corresponding to the user ID. When a leaving request of the user is received through the entering/leaving room managing apparatus, the network system deletes the registered ID information and restricts connection between the notebook computer and the network on the basis of a registration situation of the ID information to the managing server.

12 Claims, 16 Drawing Sheets

(56) References Cited

U.S. PATENT DOCUMENTS

| | | | |
|---|---|---|---|
| 2002/0095588 A1* | 7/2002 | Shigematsu et al. | 713/186 |
| 2004/0010701 A1* | 1/2004 | Umebayashi et al. | 713/193 |
| 2004/0014473 A1* | 1/2004 | Ando | 455/432.1 |
| 2004/0128345 A1* | 7/2004 | Robinson et al. | 709/203 |
| 2004/0167881 A1 | 8/2004 | Masuda | 707/3 |
| 2004/0267939 A1* | 12/2004 | Yumoto et al. | 709/227 |
| 2005/0006452 A1* | 1/2005 | Aupperle et al. | 232/45 |
| 2005/0201304 A1* | 9/2005 | Olshansky | 370/282 |
| 2005/0254489 A1* | 11/2005 | Jain et al. | 370/389 |
| 2006/0140196 A1* | 6/2006 | Tanaka et al. | 370/401 |

FOREIGN PATENT DOCUMENTS

| | | |
|---|---|---|
| JP | 2004-102879 | 4/2004 |
| JP | 2004-258702 | 9/2004 |
| JP | 2004-320275 | 11/2004 |
| WO | 2004/039116 A1 | 5/2004 |

\* cited by examiner

US 8,613,049 B2

NETWORK SYSTEM, ITS CONTROL METHOD, AND PROGRAM

TECHNICAL FIELD

The invention relates to a network system and its control method and program and, more particularly, to a network system and its control method and program for preventing an illegal access from an information processing apparatus having a radio communicating function such as a personal digital assistant or the like for the network system set in a specific area.

BACKGROUND ART

In recent years, owing to the spread of portable information processing apparatuses such as notebook computer, PDA (Personal Digital Assistant), cellular phone, and the like each having a radio communicating function, the user carries those apparatuses into a specific area, connects them to a wired or wireless LAN set in the area, and makes data communication. Therefore, a security technique to prevent illegal communication participation in the network from the information processing apparatuses has been proposed (for example, refer to JP-A-2002-232449).

Specifically speaking, a DHCP server is arranged in an outsourcing center and obtainment of an IP address by the DHCP server is disabled unless otherwise an MAC address has previously been registered. The following technique has been disclosed: when an information processing apparatus such as a computer or the like in which the MAC address is not registered is connected to the network, an enterprise or a group is specified by an authenticating server, thereafter, an MAC address registering display screen to register the MAC address is prepared, correspondence information between the MAC address and an IP address to be used is formed for the DHCP server, the IP address is dynamically searched for from the correspondence information between the MAC address and the IP address which has been registered in a database of the DHCP server, and an IP address for a user's computer is issued.

However, according to the above conventional technique, for example, in the case where, at a place where the user has gone to, he lost the information processing apparatus which had communication—participated in the network in the specific area and the third party uses such an information processing apparatus and illegally accesses the network, there is a fear that secret information or the like managed only in the specific area leaks although a security countermeasure has been made to the entering/leaving of the user into/from the specific area.

For example, as shown in FIG. 1, assuming that reference numeral 113 denotes a radio communicating terminal which is ordinarily used by a regular user 103 in a security area 101 where the secret information is protected and which was lost in the place where he has gone to and 112 indicates a third party who tries an illegal access to the network in the security area 101 by using the communicating terminal 113, according to the security countermeasure technique disclosed in JP-A-2002-232449, it is difficult to sufficiently protect the secret information.

The invention is made in consideration of the above problem and it is an object of the invention to provide a mechanism which can prevent an illegal access to a network or the like set in a specific area and improve a security of the network.

DISCLOSURE OF THE INVENTION

Accordingly, the present invention is conceived as a response to the above-described disadvantages of the conventional art.

According to one aspect of the present invention, preferably, there is provided a network system having a reading apparatus for reading security information to make user authentication, a server for managing the read security information, and at least one communicating terminal which can communicate with a network, wherein the server comprises: a reception unit adapted to receive identification information of the communicating terminal; a registration unit adapted to register the received identification information in correspondence to the security information; a deletion unit adapted to delete the registered identification information in accordance with the read security information; and a control unit adapted to control the communication between the communicating terminal and the network on the basis of a registration situation of the identification information.

Thus, the illegal access to the network or the like set in the specific area can be prevented and the security of the network can be improved.

Other features and advantages of the present invention will be apparent from the following description taken in conjunction with the accompanying drawings, in which like reference characters designate the same or similar parts throughout the figures thereof.

BEST MODE FOR CARRYING OUT THE INVENTION

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
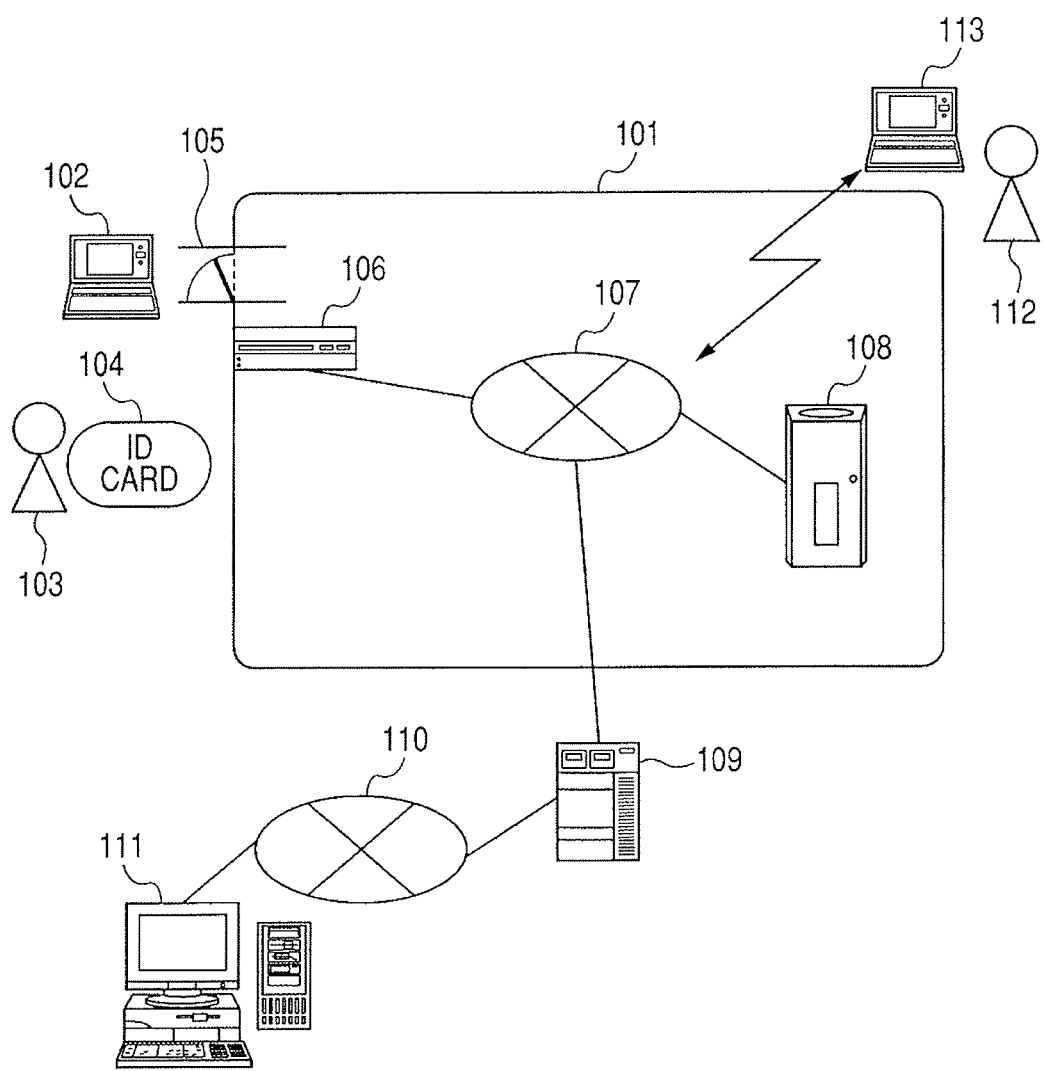
FIG. 1 is a diagram showing a whole construction of a network system according to the first embodiment of the invention.

FIG. 1 is a diagram showing a whole construction of a network system according to the first embodiment of the invention.

In FIG. 1, reference numeral 101 denotes the security area which is shut off from the outside and provided to protect secret information; 103, the regular user who can enter and leave the security area 101; and 102, a notebook computer which is owned by the user 103 and used in the security area 101. The notebook computer 102 is a communicating terminal having a wired and/or wireless communicating function and which can be connected to the wireless LAN, wired LAN, or the like. It is assumed that the "user" in each of the following embodiments denotes a personal user, a division, a group, or the like.

A contactless IC (Integral Circuit) chip also called an RFID (Radio Frequency Identification) tag or a data carrier is built in the notebook computer 102 or can be attached thereto. As an ID (identification) information to identify the notebook computer 102 from other apparatuses, for example, a MAC (Media Access Control) address of a built-in or attached LAN controller (not shown) has been stored in the contactless IC.

Reference numeral 104 denotes an ID (identification) card for user authentication necessary for the user to enter and leave the security area 101. As an example of the ID card 104, a contactless IC chip similar to that for the notebook computer 102 has been built in. A user ID to identify the user 103 has been stored as security information in the contactless IC. Reference numeral 105 denotes an entering/leaving room window of the security area 101. The user 103 enters and leaves the security area 101 through the entering/leaving room window 105. It is not always necessary to use the contactless type as an ID card 104 but a contact type ID card can be also used. Explanation will be made hereinbelow by presuming the case where the contactless type is used as an ID card 104.

Reference numeral 106 denotes an entering/leaving room managing apparatus set at the entering/leaving room window 105. The entering/leaving room managing apparatus 106 manages the person who enters and leaves the security area 101. For example, when the user 103 enters and leaves the security area 101, he holds the ID card 104 in front of the entering/leaving room managing apparatus 106, so that the user ID is automatically read out of the contactless IC built in the ID card 104 and locking, unlocking, opening, and closure of the entering/leaving room window 105 are controlled.

Reference numeral 107 denotes a network set in the security area 101. The network 107 is the LAN (Local Area Network) which can transmit and receive the data by wired or wireless communication. The entering/leaving room managing apparatus 106 and a managing server 108 are connected to the network 107. The managing server 108 can transmit and receive the data to/from the entering/leaving room managing apparatus 106 through the network 107 and manages the entering/leaving of the user to/from the security area 101.

Reference numeral 109 denotes a gateway as an apparatus for connecting the network 107 and a network 110 set in the outside of the security area 101 and controlling transfer of a data packet between the network 107 and the network 110. Reference numeral 111 denotes a server connected to the network 110. Either the LAN or the Internet can be used as a network 110.

Besides the user ID of the user 103, the ID information of the notebook computer 102 owned by the user 103 to use the notebook computer in the security area 101 can be also stored in the contactless IC built in the ID card 104. Besides the ID information of the notebook computer 102, the user ID of the user 103 can be also stored in the contactless IC in the notebook computer 102.

A fundamental hardware construction of an information processing apparatus in the system of FIG. 1, that is, the notebook computer 102, entering/leaving room managing apparatus 106, managing server 108, gateway 109, and server 111 will now be described with reference to FIG. 2.

Figure 2:
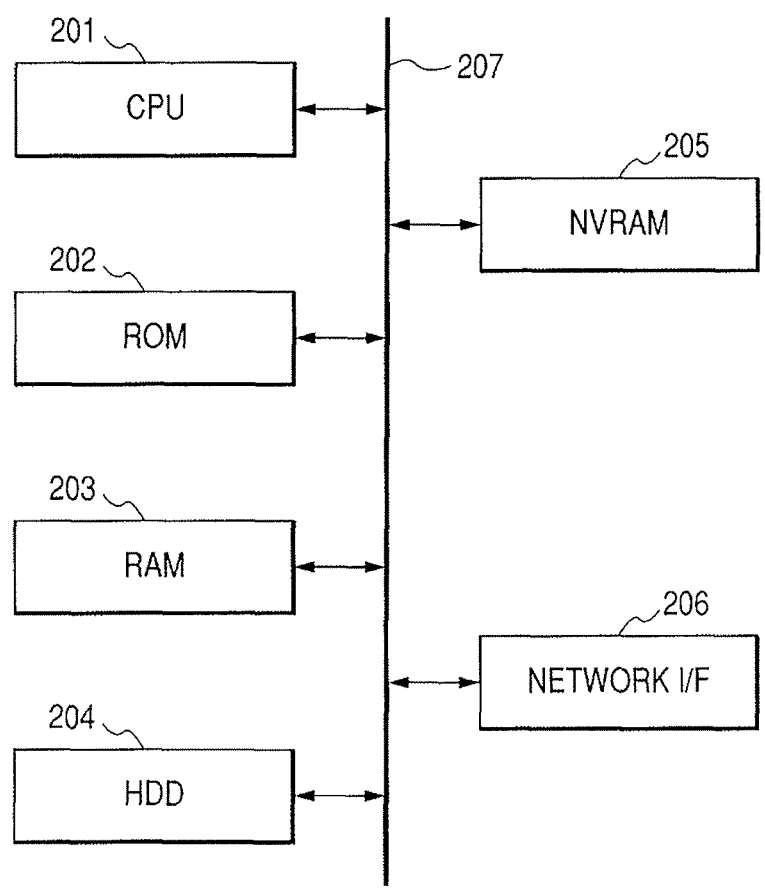
FIG. 2 is a block diagram showing a fundamental hardware construction of an information processing apparatus in the network system of FIG. 1.

FIG. 2 is a block diagram showing the fundamental hardware construction of the information processing apparatus in the network system of FIG. 1.

In FIG. 2, reference numeral 201 denotes a CPU; 202, a ROM in which various programs have been stored; 203, a RAM which is used as an arithmetic operating area at the time of the application operation; 204, a hard disk (HDD) in which applications and processing data are stored; 205, a non-volatile RAM (NVRAM) for holding fundamental setting information; and 206, a communication control unit (network I/F) for connecting to the network. Those units are mutually connected through a bus 207.

A hardware construction of an IC reader/writer built in the entering/leaving room managing apparatus 106 in FIG. 1 will now be described. The IC reader/writer is an apparatus which can read the information (data) stored in the contactless IC by the wireless communication and write data into the contactless IC.

Figure 3:
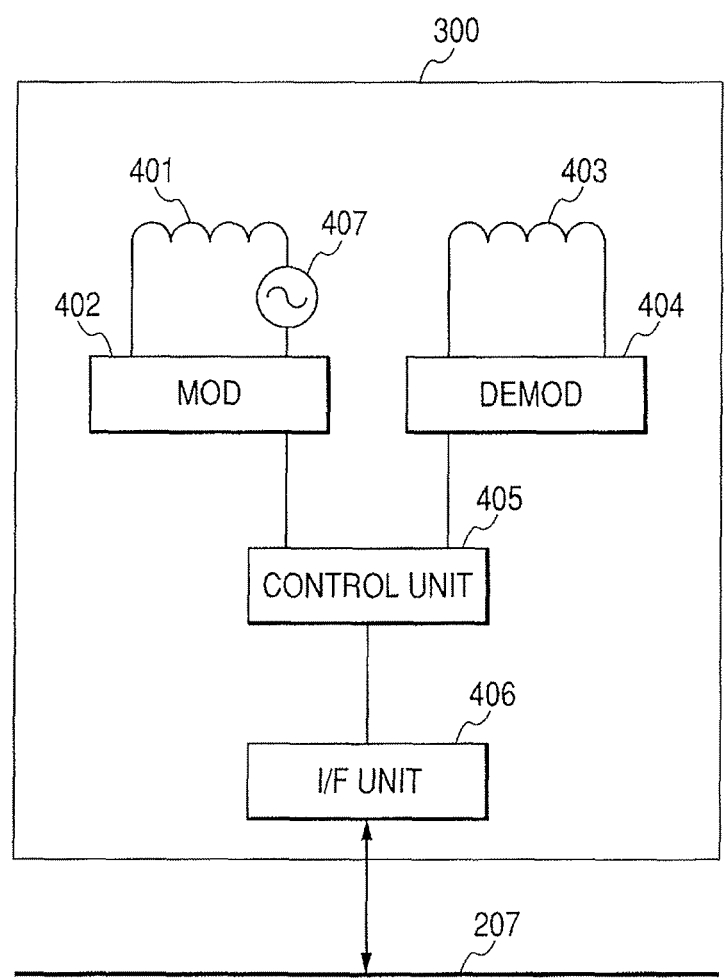
FIG. 3 is a block diagram showing a hardware construction of an IC reader/writer built in an entering/leaving room managing apparatus 106 in FIG. 1.

FIG. 3 is a block diagram showing the hardware construction of the IC reader/writer built in the entering/leaving room managing apparatus 106 in FIG. 1.

In FIG. 3, an IC reader/writer 300 has: a transmitting antenna unit 401 for transmitting a radio wave signal; a modulating circuit 402 for modulating a data signal which is transmitted from the transmitting antenna unit 401; a receiving antenna unit 403 for receiving the radio wave signal; a demodulating circuit 404 for demodulating the radio wave signal received from the receiving antenna unit 403; an I/F unit 406 for communicating with an apparatus or the like other than the contactless IC; and a control unit 405. An AC power source 407 for always transmitting a radio wave to form the electric power mentioned above is connected to the transmitting antenna unit 401.

The control unit 405 controls the transmitting antenna unit 401, modulating circuit 402, receiving antenna unit 403, demodulating circuit 404, and I/F unit 406. In accordance with an instruction from the outside, the control unit 405 allows the modulating circuit 402 to modulate the radio wave to supply the electric power and the data to be transmitted and allows the radio wave to be transmitted through the transmitting antenna unit 401. After the radio wave signal received by the receiving antenna unit 403 is demodulated by the demodulating circuit 404, the control unit 405 can convert the demodulated signal so that it can be handled as a data signal.

The hardware construction of the contactless IC built in the notebook computer 102 or the ID card 104 in FIG. 1 will now be described.

Figure 4:
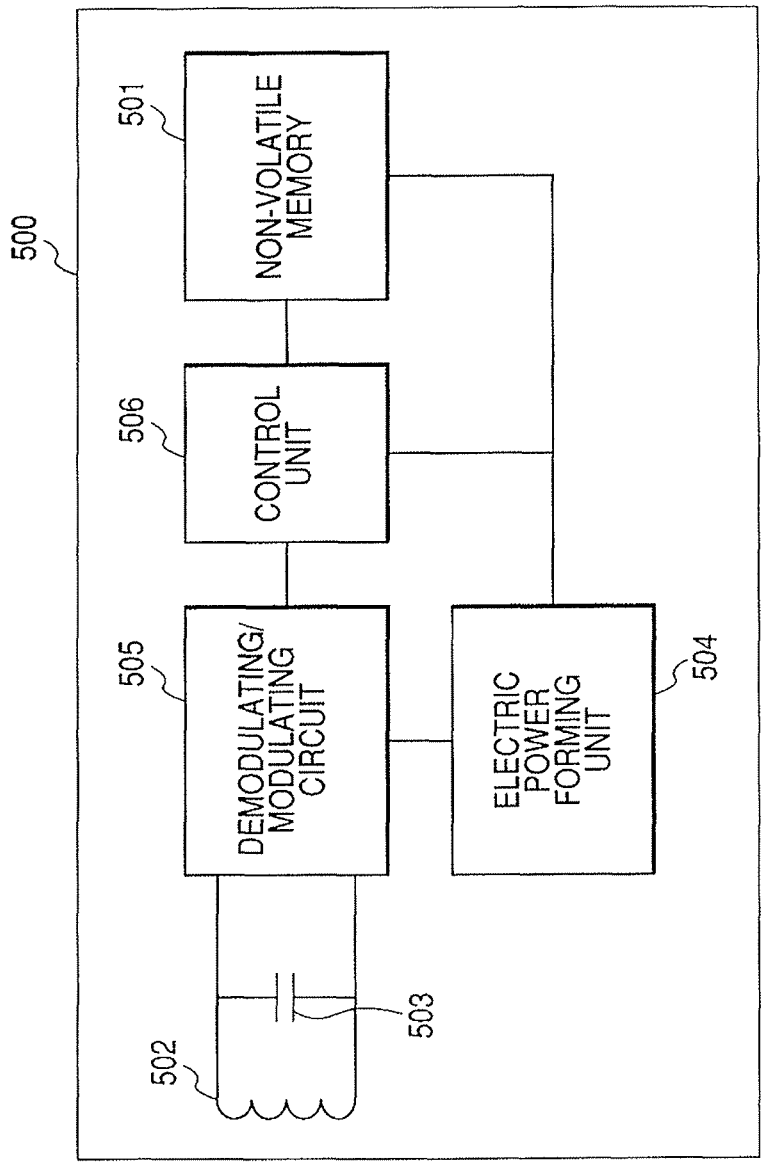
FIG. 4 is a block diagram showing a hardware construction of a contactless IC.

FIG. 4 is a block diagram showing the hardware construction of the contactless IC.

In FIG. 4, a contactless IC 500 has: a non-volatile memory 501; an antenna unit 502 for transmitting and receiving the radio wave; a resonant capacitor unit 503; an electric power forming unit 504 for rectifying and smoothing a current; a demodulating/modulating circuit 505 for demodulating and modulating the radio wave; and a control unit 506. The contactless IC 500 does not have a power source such as a battery or the like therein but induces an electric power on the basis of the radio wave which is supplied from the IC reader/writer 300. That is, the antenna unit 502 forms a resonant circuit in combination with the resonant capacitor unit 503.

Since the IC reader/writer 300 always generates the radio wave (AC magnetic field) to form the electric power, when the contactless IC 500 is held to the IC reader/writer 300, an induction current is generated in the resonant circuit in the contactless IC 500 by an electromagnetic inducing operation. The induction current is outputted to the electric power forming unit 504. The electric power forming unit 504 rectifies and smoothes the inputted induction current, forms the electric power of a predetermined voltage, and supplies it to the non-volatile memory 501, control unit 506, and demodulating/modulating circuit 505.

The IC reader/writer 300 also simultaneously transmits radio wave signals regarding various kinds of data in addition to the radio wave signal for forming the electric power. The radio wave signal regarding the data is demodulated by the demodulating/modulating circuit 505 and written into the non-volatile memory 501 under the control of the control unit 506. The control unit 506 reads out the data from the non-volatile memory 501, allows it to be modulated by the demodulating/modulating circuit 505, and transmits the modulated data as a radio wave signal through the antenna unit 502.

Figure 5:
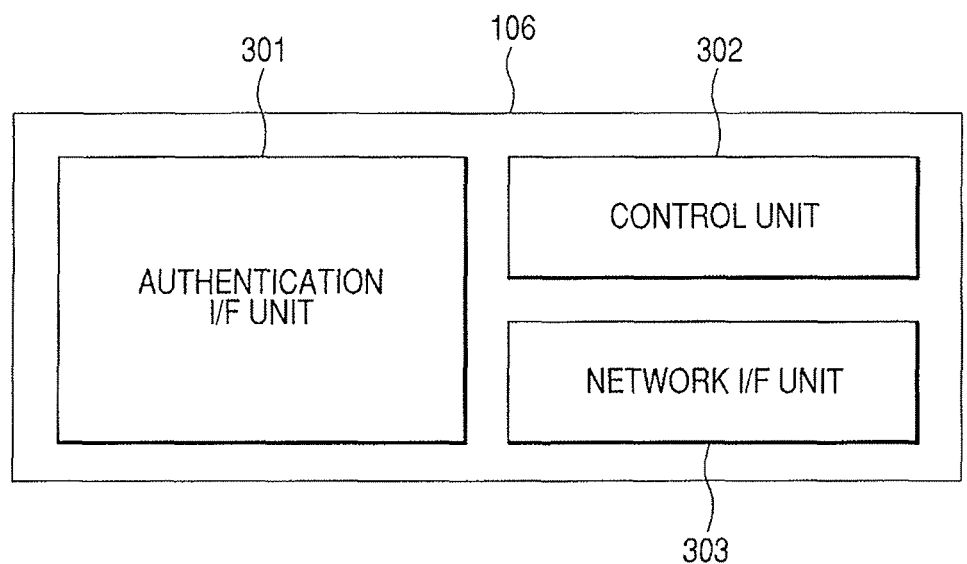
FIG. 5 is a block diagram showing a fundamental functional construction of the entering/leaving room managing apparatus 106.

FIG. 5 is a block diagram showing a fundamental functional construction of the entering/leaving room managing apparatus 106. This diagram shows functions which are realized by processes of the CPU 201 for executing programs stored in the ROM 202 or HDD 204 on the basis of the hardware construction shown in FIG. 2.

In FIG. 5, reference numeral 301 denotes an authentication interface (I/F) unit. The authentication I/F unit 301 corresponds to input/output (I/O) means for reading the ID information and user ID of the notebook computer 102 from the contactless IC built in the notebook computer 102 or ID card 104. For this purpose, the IC reader/writer 300 is included in the authentication I/F unit 301.

Reference numeral 302 denotes a control unit for executing a process to input the ID information through the authentication I/F unit 301, a process to transmit and receive the inputted ID information to/from a network interface (I/F) unit 303, and the like. The network I/F unit 303 corresponds to input/output (I/O) means for inputting and outputting information to/from an external apparatus on the network. For example, the network I/F unit 303 operates when it communicates with the managing server 108.

Figure 6A:
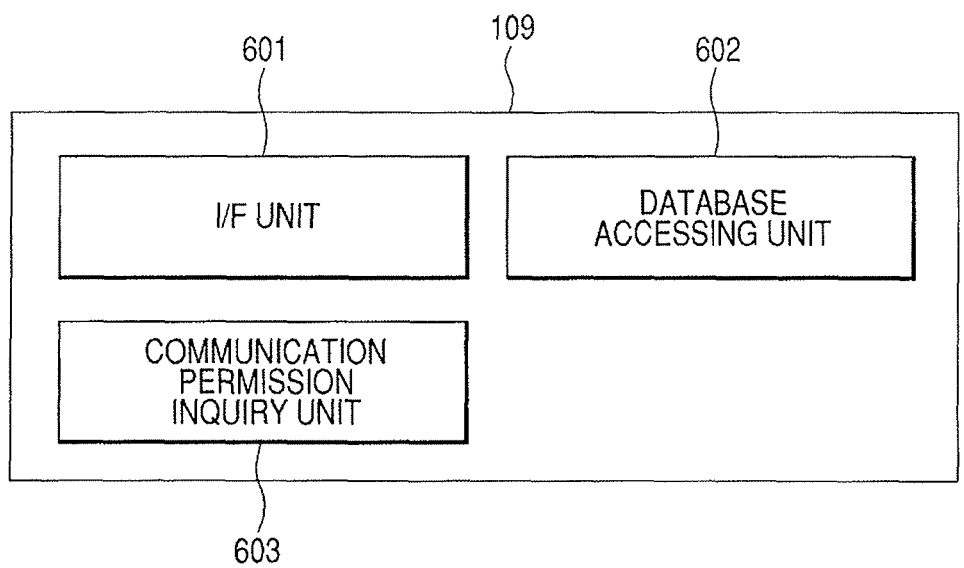
FIG. 6A is a block diagram showing a fundamental functional construction of a gateway 109 in FIG. 1.
Figure 6B:
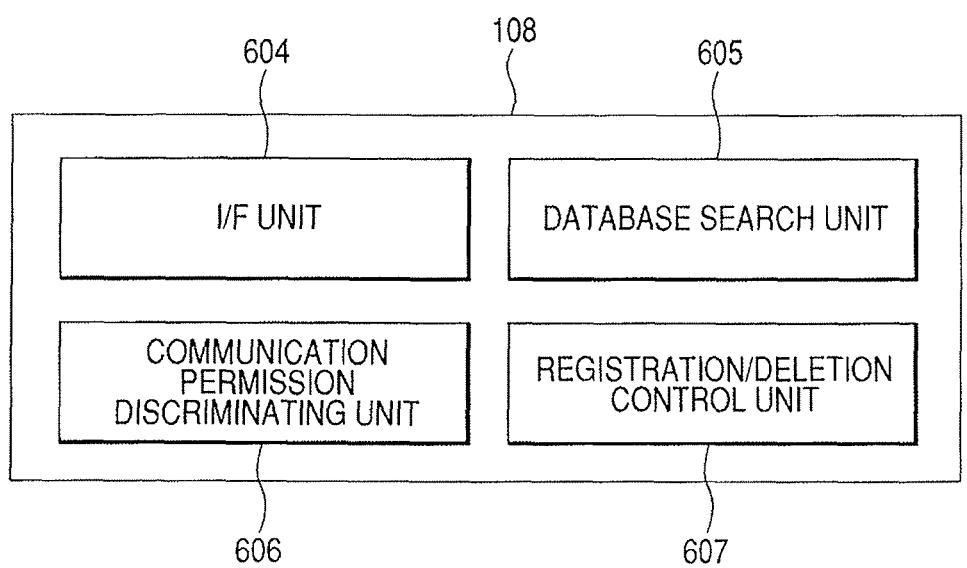
FIG. 6B is a block diagram showing a fundamental functional construction of a managing server 108 in FIG. 1.

FIG. 6A is a block diagram showing a fundamental functional construction of the gateway 109 in FIG. 1. FIG. 6B is a block diagram showing a fundamental functional construction of the managing server 108 in FIG. 1. These diagrams show functions which are realized by the processes of the CPU 201 for executing the programs stored in the ROM 202 or HDD 204 on the basis of the hardware construction shown in FIG. 2.

In FIG. 6A, reference numeral 601 denotes an interface (I/F) unit for communicating with the managing server 108 or the server 111. The I/F unit 601 has a function of executing processes shown in FIGS. 10 and 11, which will be explained hereinafter.

Reference numeral 602 denotes a database accessing unit for access the ID information registered in the managing server 108 in step S708 in FIG. 8, which will be explained hereinafter.

Reference numeral 603 denotes a communication permission inquiry unit having a function of executing an inquiry about the ID information in step S903 in FIG. 10, which will be explained hereinafter.

In FIG. 6B, reference numeral 604 denotes an I/F unit for communicating with the notebook computer 102, entering/leaving room managing apparatus 106, and gateway 109. Reference numeral 605 denotes a database search unit for searching for the data registered in the managing server 108.

Reference numeral 606 denotes a communication permission discriminating unit for discriminating about the permission of communication in accordance with the inquiry from the communication permission inquiry unit 603 of the gateway 109. For example, in step S705 in FIG. 8, a result of this discrimination is referred to by the managing server 108. Reference numeral 607 denotes a registration/deletion control unit for registering the ID information in step S708 in FIG. 8 and deleting the ID information in step S711.

The operation of the entering/leaving room managing apparatus 106 and the managing server 108 when the user 103 enters the security area 101 will now be described.

Figure 7:
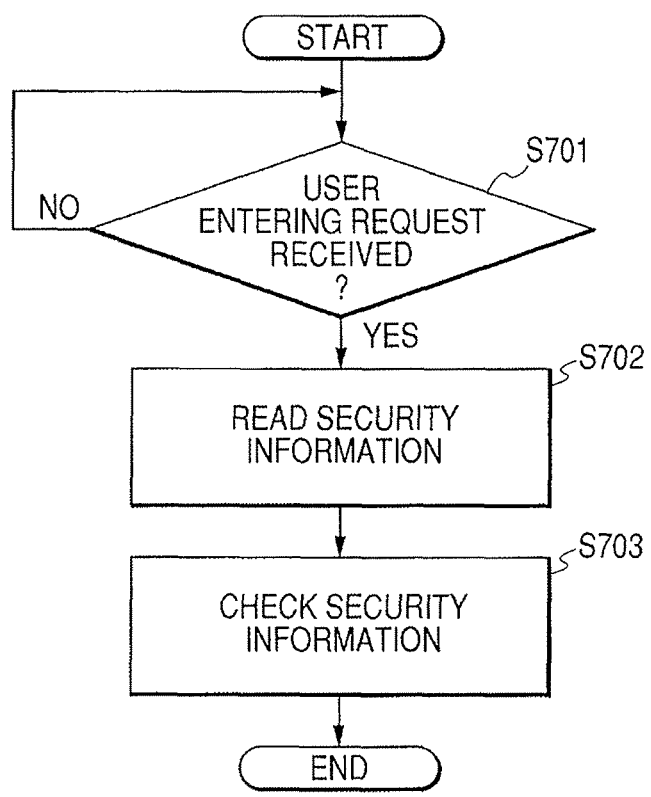
FIG. 7 is a flowchart showing a user entering room process by the entering/leaving room managing apparatus 106.

FIG. 7 is a flowchart showing a user entering room process by the entering/leaving room managing apparatus 106 in FIG. 1. This process is executed by the cooperative operation of the authentication I/F unit 301, control unit 302, and network I/F unit 303.

In FIG. 7, whether or not a user entering request including the security information has been received is discriminated in step S701. If it is determined as a result of this discrimination that the user entering request has been received, the security information is read out (step S702). In this instance, the user 103 who enters the security area 101 holds the ID card 104 in front of the entering/leaving room managing apparatus 106 as a user entering request, so that the user ID is read out as security information from the contactless IC built in the ID card 104 by the IC reader/writer 300 in the entering/leaving room managing apparatus 106. At this time, if an MAC address of the notebook computer 102 carried by the user 103 has been stored in the contactless IC built in the ID card 104, the MAC address is also read out.

Subsequently, the read-out security information is discriminated (step S703). In this instance, the read-out security information is transmitted to the managing server 108 and the managing server 108 is made to discriminate whether or not the user 103 has been permitted to enter the security area 101. If the entering is not permitted as a result of the discrimination, the entering/leaving room window 105 is held in the locking state but is not opened and a warning showing that the entering is not permitted is displayed on a display unit (not shown) of the entering/leaving room managing apparatus 106. On the other hand, if the entering is permitted, the entering/leaving room window 105 is unlocked and opened. The discrimination about the permission or not-permission of the entering of the user can be also made by the entering/ leaving room managing apparatus 106 instead of the managing server 108. In this case, the user ID of the user who is permitted to enter the security area 101 is permitted has been registered in the entering/leaving room managing apparatus 106.

Figure 8:
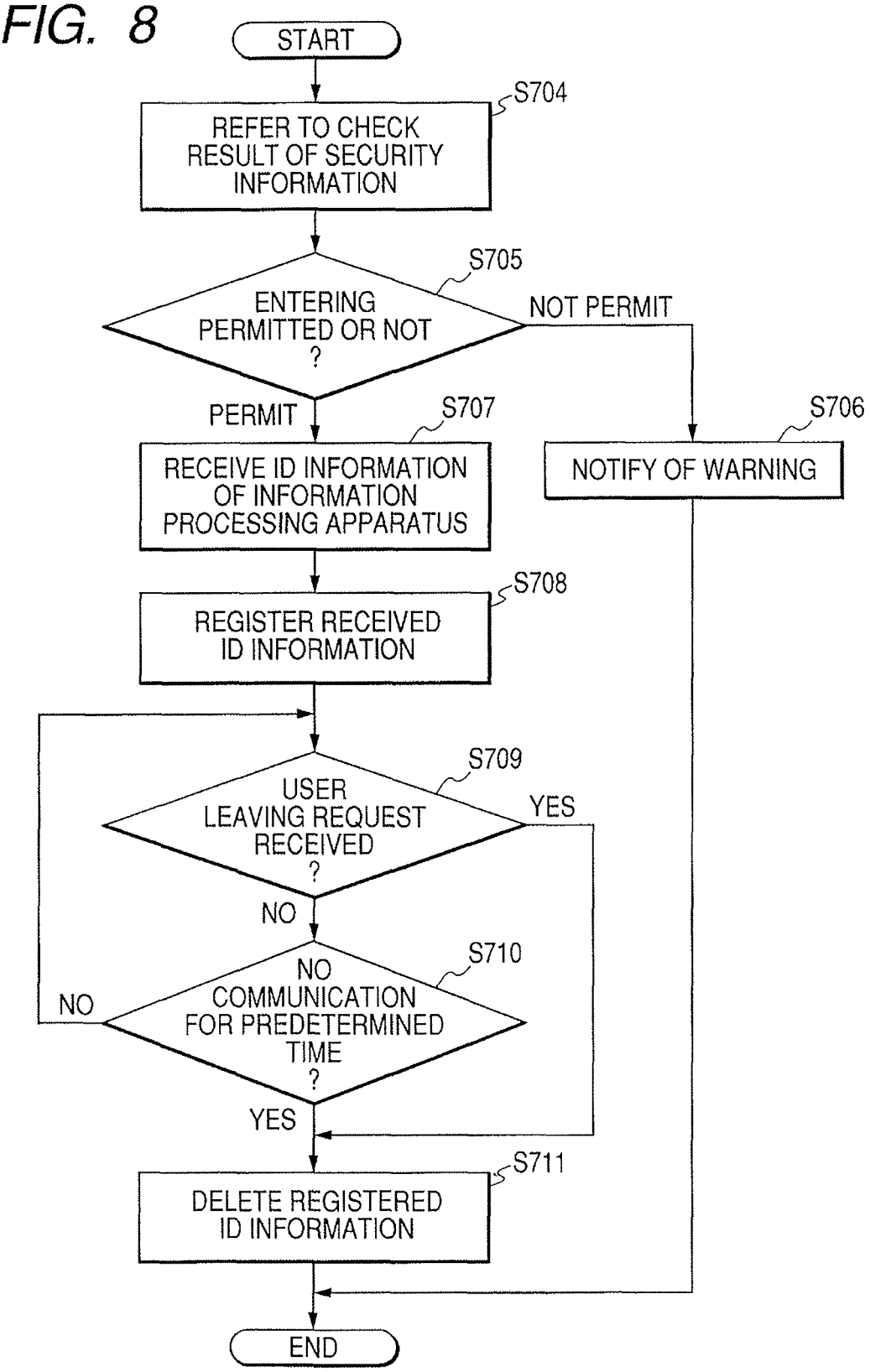
FIG. 8 is a flowchart showing a user entering room process by the managing server 108 in FIG. 1.

FIG. 8 is a flowchart showing a user entering/leaving room process by the managing server 108 in FIG. 1. This process is executed by the cooperative operation of the I/F unit 604, database search unit 605, and registration/deletion control unit 607.

In FIG. 8, the discrimination result about the security information is referred to in step S704. In this instance, the user ID received from the entering/leaving room managing apparatus 106 is collated with the user ID which has previously been registered in the managing server 108.

Subsequently, whether or not the entering is permitted is discriminated in accordance with the discrimination result of step S704 (step S705). If the entering is not permitted as a result, the entering/leaving room managing apparatus 106 is notified of a warning (step S706). In the entering/leaving room managing apparatus 106, when the warning notification is received, the entering/leaving room window 105 is held in the locking state but is not opened, the warning is displayed by the display unit, or a warning sound is generated as mentioned above.

When the entering is permitted as a result of the discrimination in step S705, the MAC address of the notebook computer 102 (information processing apparatus) carried by the user 103 when he enters the security area 101 is received as ID information (step S707). The received ID information is registered (step S708). This ID information is the information which has been read out of the contactless IC in the notebook computer 102 (or ID card 104) by the IC reader/writer 300 in the entering/leaving room managing apparatus 106 in the process of step S702 in FIG. 7 and transmitted from the entering/leaving room managing apparatus 106 together with the security information. However, it may be also the information which has been read out by another reading apparatus. As such another reading apparatus, for example, it is sufficient to use an apparatus which can read out the user ID recorded in the ID card 104 and the ID information (ID information of the information processing apparatus) of a communicating terminal recorded in the notebook computer 102 carried by the user and can notify the managing server 108 of the read-out information. The received ID information is registered into a database, which will be explained hereinafter, together with the user ID.

Subsequently, whether or not a user leaving request has been received from the entering/leaving room managing apparatus 106 is discriminated (step S709). In this instance, when the user 103 who leaves the security area 101 holds the ID card 104 in front of the entering/leaving room managing apparatus 106 as a user leaving request, the user ID is read out as security information from the contactless IC in the ID card 104 by the IC reader/writer 300 in the entering/leaving room managing apparatus 106.

When the user leaving request is received as a discrimination result of step S709, in step S708, the ID information registered in correspondence to the user ID of the user 103 in step S708, that is, the MAC address is deleted (step S711). If the user leaving request is not received, whether or not the wired or wireless communication with the notebook computer 102 is not executed for a predetermined time is discriminated (step S710). Thus, if the communication is not executed for the predetermined time as a discrimination result, the processing routine advances to step S711. The processing routine is finished.

A network connection permission table which is stored as a database into the hard disk 204 or the like in the managing server 108 and into/from which the ID information is registered and deleted in steps S708 and S711 in FIG. 8 will now be described with reference to FIG. 9.

Figure 9:
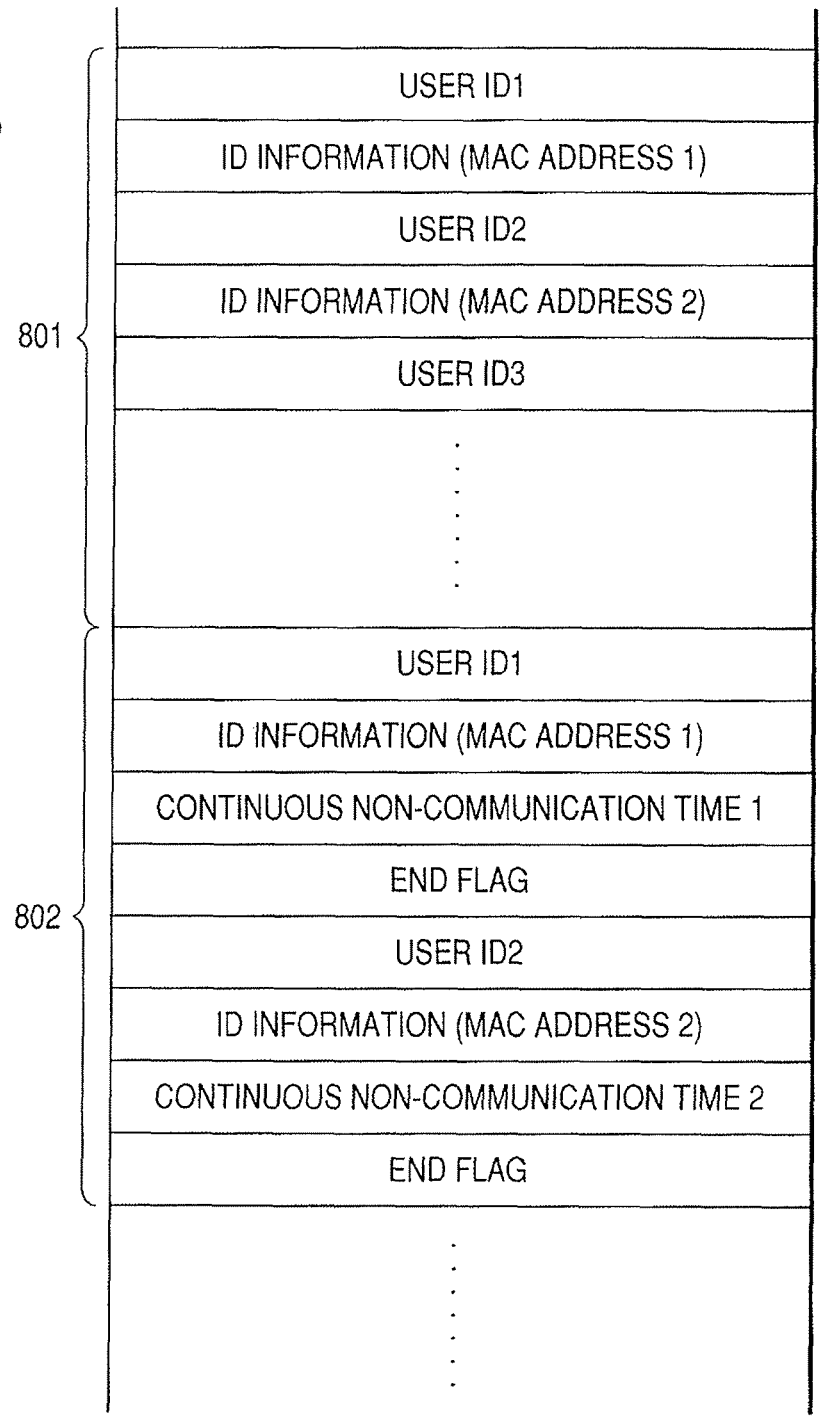
FIG. 9 is a diagram showing an example of a network connection permission table which is managed by the managing server 108.

FIG. 9 is a diagram showing an example of the network connection permission table which is managed by the managing server 108.

In FIG. 9, the network connection permission table is divided into an ID managing area 801 and an entering room managing area 802. The user IDs (user ID1, user ID2, user ID3, . . . ) of the user who is permitted to enter the security area 101 is permitted have been registered in the ID managing area 801, respectively. ID information (MAC address 1, MAC address 2, . . . ) of the communicating terminals such as notebook-sized personal computers and the like which are used in the security area 101 by the users have been registered in correspondence to the user IDs, respectively. The information registered in the ID managing area 801 is the information which has previously been registered in the network connection permission table by the administrator or the like of the network system and does not become the target of the registration/deletion of the ID information in steps S708 and S711 in FIG. 8 mentioned above.

The user IDs (user ID1, user ID2, . . . ) of the users whose entering was confirmed by the entering/leaving room managing apparatus 106 and the ID information (MAC address 1, MAC address 2, . . . ) of the communicating terminals carried by the users whose entering was confirmed have been registered in the entering room managing area 802 as security information received from the entering/leaving room managing apparatus 106. Those information is the information registered in step S708 in FIG. 8.

A continuous non-communication time (continuous non-communication time 1, continuous non-communication time 2, . . . ) between the network and the communicating terminals has been registered in the entering room managing area 802 in correspondence to the user IDs, respectively. The continuous non-communication time denotes the time during which the communication is not made between the notebook computer 102 or the like carried in the security area 101 by the user and the network 107. A value of the continuous non-communication time is always updated. The continuous non-communication time is referred to in step S710 in FIG. 8. When the continuous non-communication time exceeds a predetermined time, it is deleted together with the user ID and ID information registered in the network connection permission table.

A transfer permitting/not-permitting process of a data packet transmitted from the notebook computer 102 which is executed by the gateway 109 will now be described with reference to FIG. 10.

Figure 10:
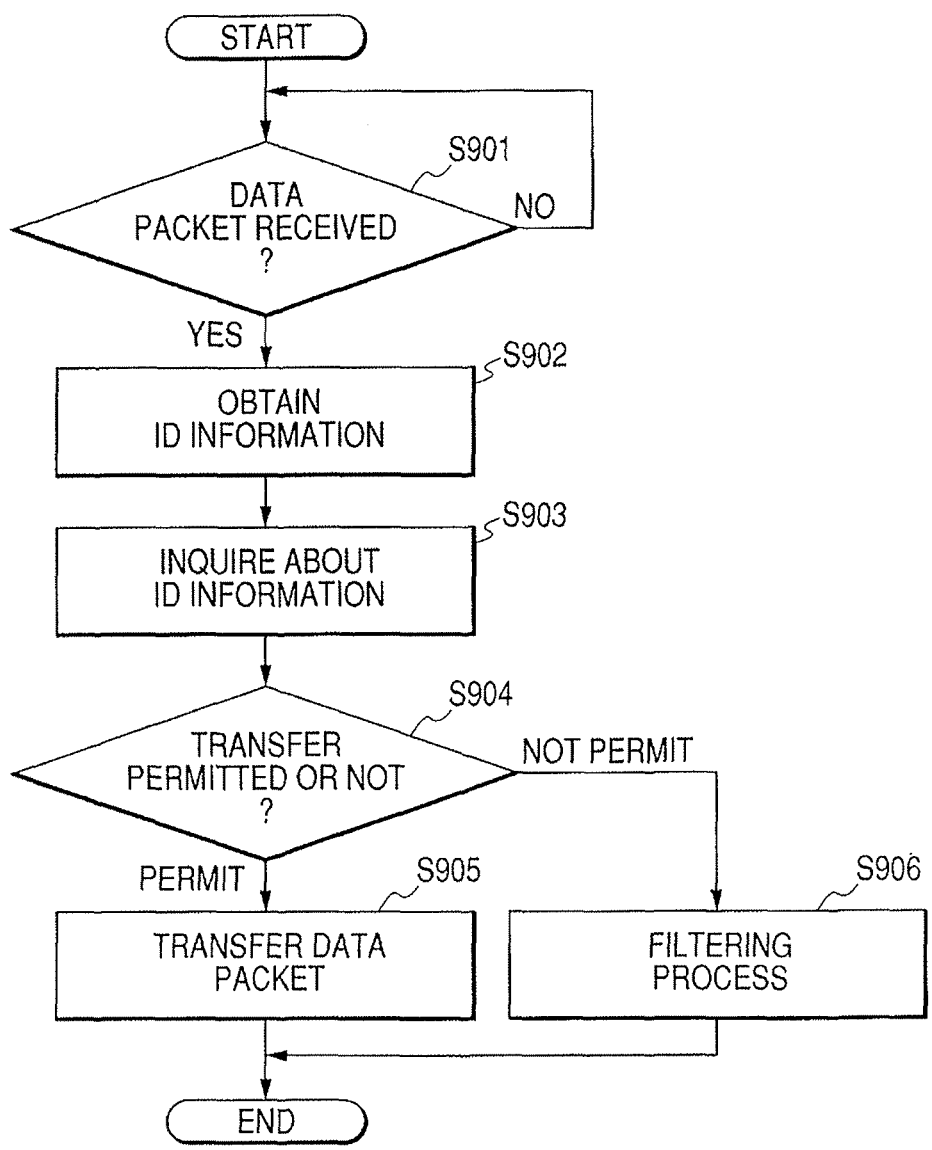
FIG. 10 is a flowchart showing a permitting/not-permitting process of data packet transfer by the gateway 109 in FIG. 1.

FIG. 10 is a flowchart showing the permitting/not-permitting process of the data packet transfer by the gateway 109 in FIG. 1. This process is executed by the cooperative operation of the I/F unit 601, database accessing unit 602, and communication permission inquiry unit 603.

In FIG. 10, when the data packet is received from the notebook computer 102 by the wireless communication or the like (YES in step S901), the gateway 109 obtains the MAC address, as ID information, of the notebook computer 102 from the received packet data (step S902).

The obtained ID information is subsequently transmitted to the managing server 108 and whether or not it is the registered ID information is inquired (step S903). At this time, the managing server 108 searches for the relevant ID information (MAC address) with reference to the entering room managing area 802 in the network connection permission table shown in FIG. 9 and returns a search result to the gateway 109.

The gateway 109 receives the search result from the managing server 108 and discriminates whether or not the transfer is permitted (step S904). If the transfer is not permitted as a result of the discrimination, that is, if the ID information is not registered in the entering room managing area 802 ("not-permit" in step S904), a filtering process is executed in step S906. The data packet received from the notebook computer 102 at arbitrary timing is abandoned and the present processing routine is finished.

If the transfer is permitted as a discrimination result of step S904, that is, if the ID information has been registered in the entering room managing area 802 ("permit" in step S904), the received data packet is transferred (step S905) and the present processing routine is finished.

For example, in the case where the user 103 lost the notebook computer 102 at the place where he has gone to and the third party accessed the network from a place out of the security area 101 by using the lost notebook computer 102, since the ID information of the notebook computer 102 which had been registered in the managing server 108 has been deleted by the present process, the data packet cannot be transferred through the gateway 109. Thus, illegal access by the third party using the notebook computer 102 can be easily prevented.

Figure 11:
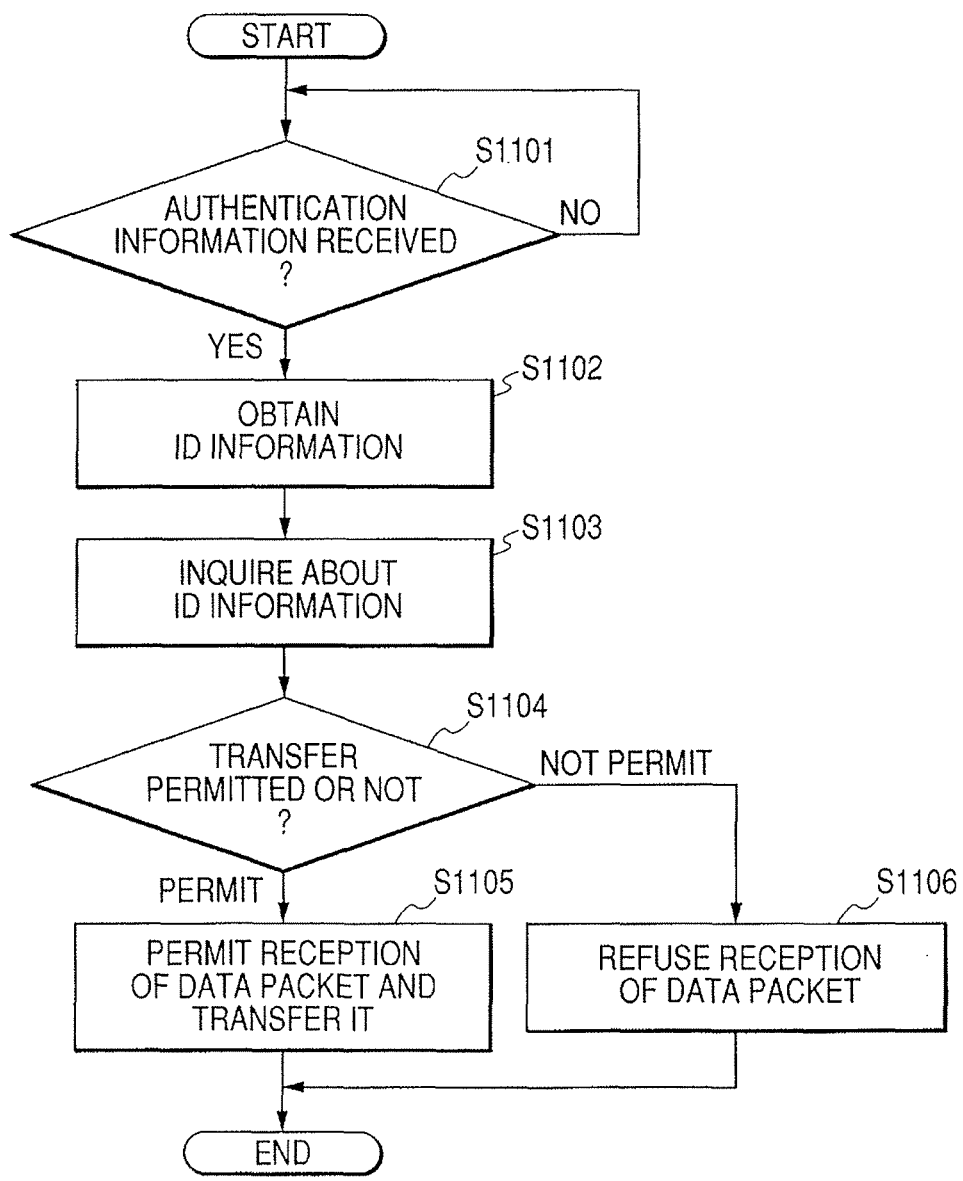
FIG. 11 is a flowchart showing another example of the process in FIG. 10.

As an application example, as shown in FIG. 11, the above process can be replaced by a method whereby whether or not authentication information has been received from the notebook computer 102 is discriminated (step S1101), thereafter, the processes in steps S902 to S904 in FIG. 10 are executed in steps S1102 to S1104, when the transfer is permitted, the reception of the data packet is permitted and the data packet is transferred (step S1105), and if the transfer is not permitted, the reception of the data packet is refused (step S1106).

Although the above processes have been executed by the gateway 109, they can be also executed by the managing server 108. Thus, irrespective of the wired or wireless communication, the illegal access by the third party using the notebook computer 102 which is made from the place out of the security area 101 can be easily prevented.

According to the foregoing first embodiment, the permission of the entering of the user 103 into the security area 101 is made in accordance with the security information (user ID) read out of the carrying ID card 104 by the entering/leaving room managing apparatus 106, the MAC address of the notebook computer 102 carried when the user 103 enters the security area 101 is registered into the managing server 108 as ID information corresponding to the user ID, and when the leaving request of the user is received through the entering/leaving room managing apparatus 106, the registered ID information is deleted. Also in the case where the leaving request of the user is not received and the communication between the notebook computer 102 and the network 107 is not made for the predetermined time, the ID information is similarly deleted. When the ID information has been registered in the managing server 108, the data packet transmitted from the notebook computer 102 is allowed to pass through the gateway 109, and the data packets transmitted from the notebook computers which are not registered are abandoned. Therefore, the illegal access to the network set in the specific area can be prevented and the security of the network can be improved.

For example, in the case where, at the place where the user 103 has gone to, he lost the notebook computer 102 which had communication-participated in the network 107 in the security area 101 and the third party accessed the network 107 from a place out of the security area 101 by using the lost notebook computer 102, the data transfer between the networks cannot be performed and the illegal use of the network can be prevented.

The illegal use of the network by a portable communicating terminal such as notebook-sized personal computer, PDA, or the like which was illegally carried into the security area 101 can be prevented and the security can be improved.

Further, it is possible to construct in such a manner that if the state where the user who carries the communicating terminal exists in the specific area cannot be detected, the data packet from the communicating terminal is inhibited to pass through the gateway 109. The illegal use of the network by the third party is prevented. It is possible to prevent that the third party illegally uses the communicating terminal of another user and connects it to the network, so that the security can be improved.

Second Embodiment

A network system according to the second embodiment of the invention will now be described. Since a construction of the network system is substantially the same as that of the network system described above in the first embodiment, its explanation is omitted here. Only points different from the first embodiment will be mainly explained hereinbelow.

Figure 12:
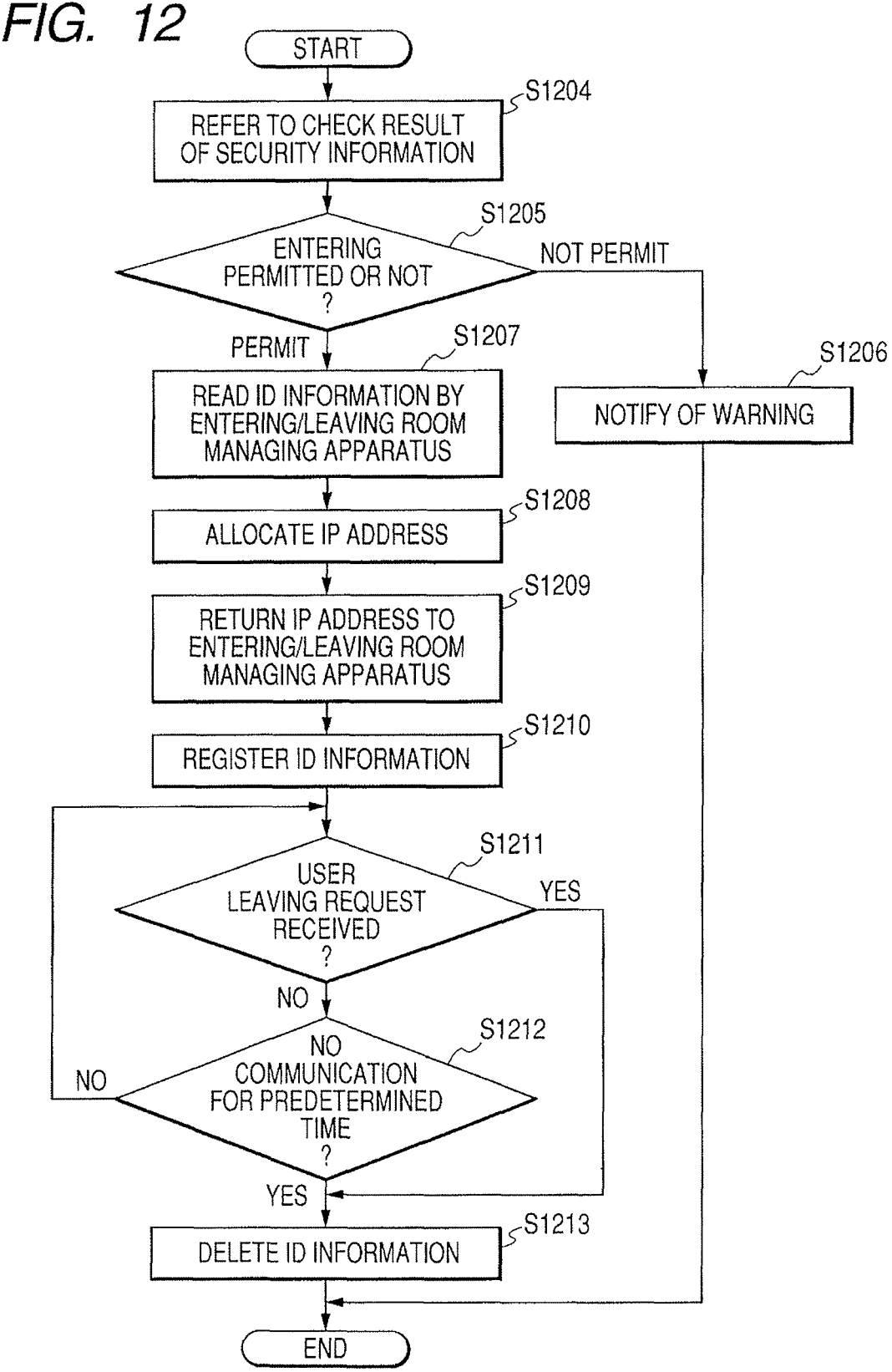
FIG. 12 is a flowchart showing a user entering/leaving room process by the managing server 108 according to the second embodiment of the invention.

FIG. 12 is a flowchart showing a user entering/leaving room process by the managing server 108 according to the second embodiment of the invention. This process is executed by the cooperative operation of the I/F unit 604, database search unit 605, and registration/deletion control unit 607.

In FIG. 12, the discrimination result about the security information is referred to in step S1204 in a manner similar to step S704 in FIG. 8. In this instance, the user ID received from the entering/leaving room managing apparatus 106 is collated with the user ID which has previously been registered in the managing server 108.

Subsequently, whether or not the entering is permitted is discriminated in accordance with the discrimination result of step S1204 (step S1205). If the entering is not permitted as a result, the entering/leaving room managing apparatus 106 is notified of a warning (step S1206) in a manner similar to step S706 in FIG. 8.

When the entering is permitted as a result of the discrimination in step S1205, the MAC address of the notebook computer 102 is read out as ID information by the entering/leaving room managing apparatus 106 from the notebook computer 102 carried by the user 103 (step S1207). The read-out MAC address is transmitted to the managing server 108.

Subsequently, the managing server 108 receives the ID information from the entering/leaving room managing apparatus 106 and allocates the IP address to the received ID information (step S1208). The managing server 108 obtains and stores a plurality of IP addresses which have previously been fixed or dynamically formed and allocates and returns one of the plurality of IP addresses in accordance with a request from the entering/leaving room managing apparatus 106 (step S1209). When the IP address is returned from the managing server 108, the entering/leaving room managing apparatus 106 writes the IP address into the contactless IC in the notebook computer 102 by the IC reader/writer 300. At a point of time when the writing of the IP address into the contactless IC is finished, the entering/leaving room window 105 is unlocked, so that the user 103 can enter the security area 101.

Figure 13:
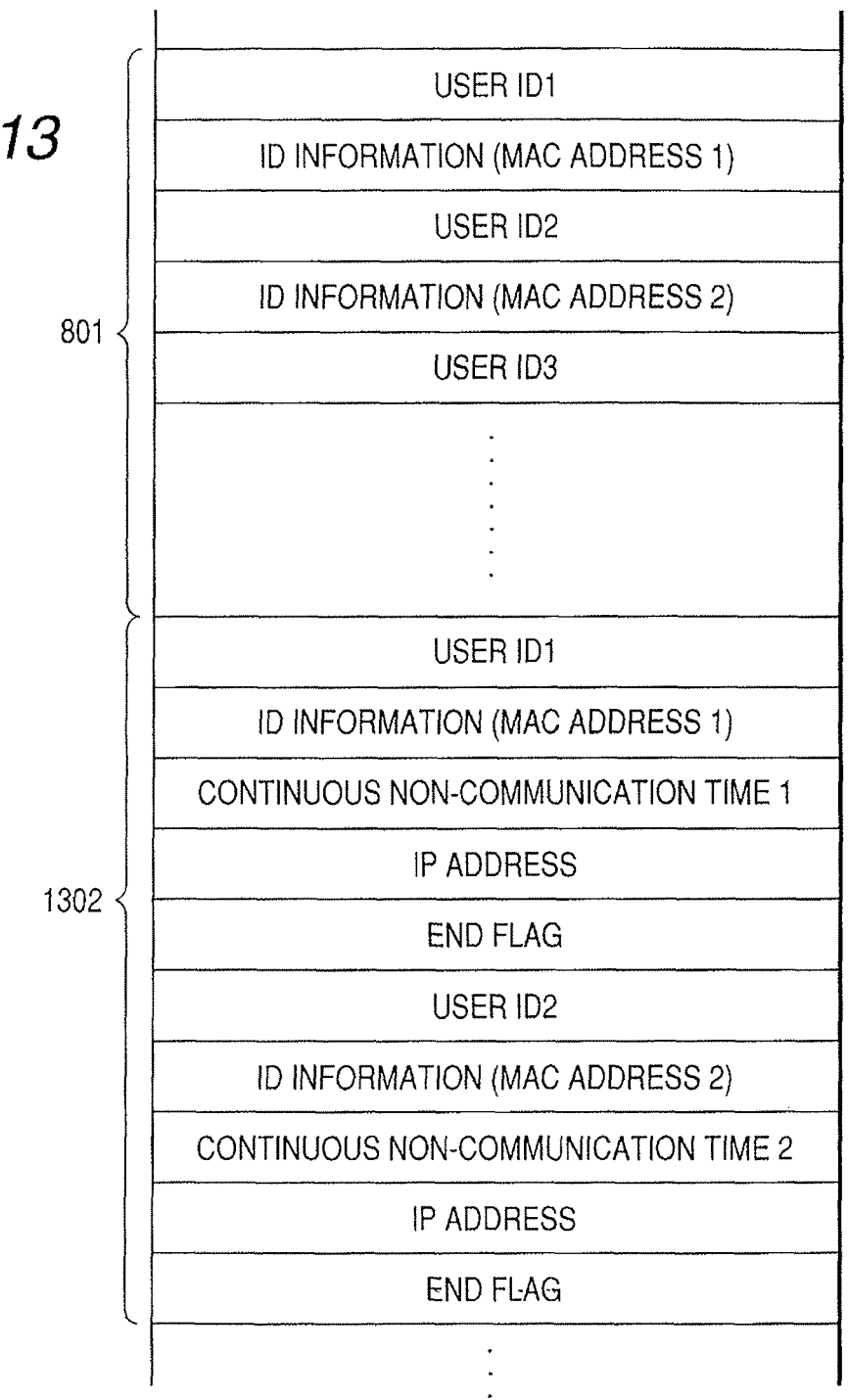
FIG. 13 is a diagram showing an example of the network connection permission table which is managed by the managing server 108.

Subsequently, the ID information received from the entering/leaving room managing apparatus 106 is registered (step S1210). In this instance, as shown in FIG. 13, the user ID, MAC address, and IP address of the user 103 are registered into an entering room managing area 1302.

Processes similar to those of steps S709 to S711 in FIG. 8 are executed in steps S1211 to S1213.

The permitting/not-permitting process of the data packet received from the notebook computer 102 which is executed by the gateway 109 will now be described with reference to FIG. 14.

Figure 14:
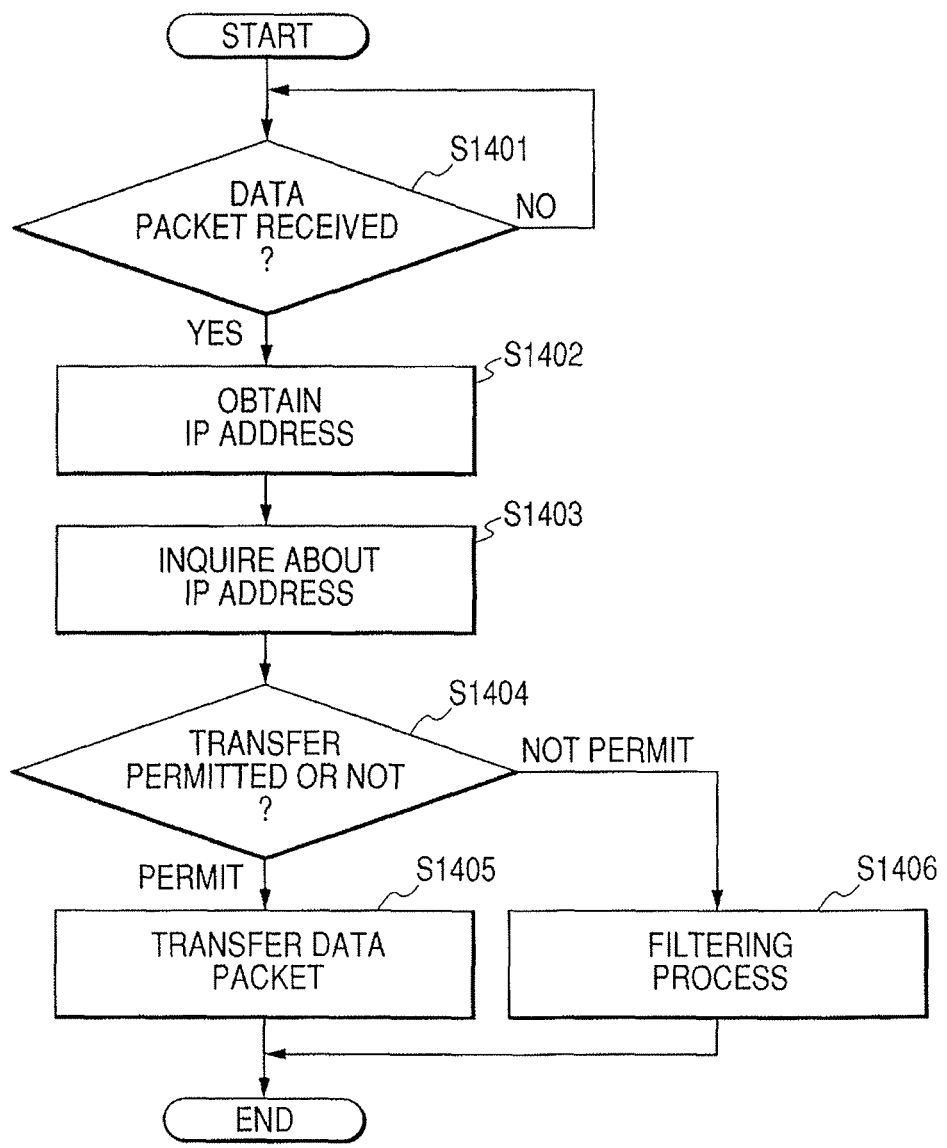
FIG. 14 is a flowchart showing the permitting/not-permitting process of the data packet transfer by the gateway 109.

FIG. 14 is a flowchart showing the permitting/not-permitting process of the data packet transfer by the gateway 109. This process is executed by the cooperative operation of the I/F unit 601, database accessing unit 602, and communication permission inquiry unit 603.

In this process, when the notebook computer 102 is activated, a driver which operates on the notebook computer 102 reads out the fixed IP address written by the entering/leaving room managing apparatus 106 in the processing routine of FIG. 12 mentioned above from the contactless IC and transmits and receives the data packet onto/from the network 107 by using the fixed IP address.

In FIG. 14, when the data packet is received, for example, from the notebook computer 102 existing out of the security area 101 by the wireless communication or the like (YES in step S1401), the gateway 109 obtains the IP address, as ID information, of the notebook computer 102 from the received packet data (step S1402).

The obtained IP address is subsequently transmitted to the managing server 108 and whether or not it is the registered IP address is inquired (step S1403). At this time, the managing server 108 searches for the relevant IP address with reference to the entering room managing area 1302 shown in FIG. 13 and returns a search result to the gateway 109.

The gateway 109 receives the search result from the managing server 108 and discriminates whether or not the transfer is permitted (step S1404) in a manner similar to steps S904 to S906 in FIG. 10. If the transfer is not permitted as a result of the discrimination, that is, if the IP address is not registered in the entering room managing area 1302 ("not-permit" in step S1404), a filtering process is executed in step S1406. The data packet is abandoned and the present processing routine is finished.

If the transfer is permitted as a discrimination result of step S1404, that is, if the IP address has been registered in the entering room managing area 1302 ("permit" in step S1404), the data packet is transferred (step S1405) and the present processing routine is finished.

According to the second embodiment, the permission of the entering of the user 103 into the security area 101 is performed in accordance with the security information (user ID) read out of the contactless IC in the carried ID card 104 by the entering/leaving room managing apparatus 106, the fixed IP address which has previously been allocated to the managing server 108 is written into the contactless IC in the notebook computer 102 carried by the user 103 when he enters. The MAC address and the IP address of the notebook computer 102 are registered into the managing server 108 as ID information corresponding to the user ID, and when the leaving request of the user is received through the entering/leaving room managing apparatus 106, the registered ID information is deleted. Also in the case where the leaving request of the user is not received and the communication between the notebook computer 102 and the network 107 is not made for the predetermined time, the ID information is similarly deleted. When the ID information has been registered in the managing server 108, the data packet transmitted from the notebook computer 102 is allowed to pass through the gateway 109, and the data packets transmitted from the notebook computers which are not registered are abandoned. Therefore, the illegal access to the network set in the specific area can be prevented and the security of the network can be improved.

For example, in the case where, at the place where the user 103 has gone to, he lost the notebook computer 102 which had communication-participated in the network 107 in the security area 101 and the third party illegally accessed the network 107 from a place out of the security area 101 by using the lost notebook computer 102, the data transfer between the networks cannot be performed and the illegal use of the network can be prevented.

When the user leaves together with the communicating terminal or the like carried into the security area 101, the IP address information is deleted by the entering/leaving room managing apparatus 106 from the contactless IC added to the terminal and the ID information registered in the managing server 108 is also deleted. Therefore, the fixed IP address allocated to the terminal can be allocated to another user.

Third Embodiment

A network system according to the third embodiment of the invention will now be described. Since a construction of the network system is substantially the same as that of the network system described above in the first or second embodiment, its explanation is omitted here. Only points different from the first and second embodiments will be explained hereinbelow.

Figure 15:
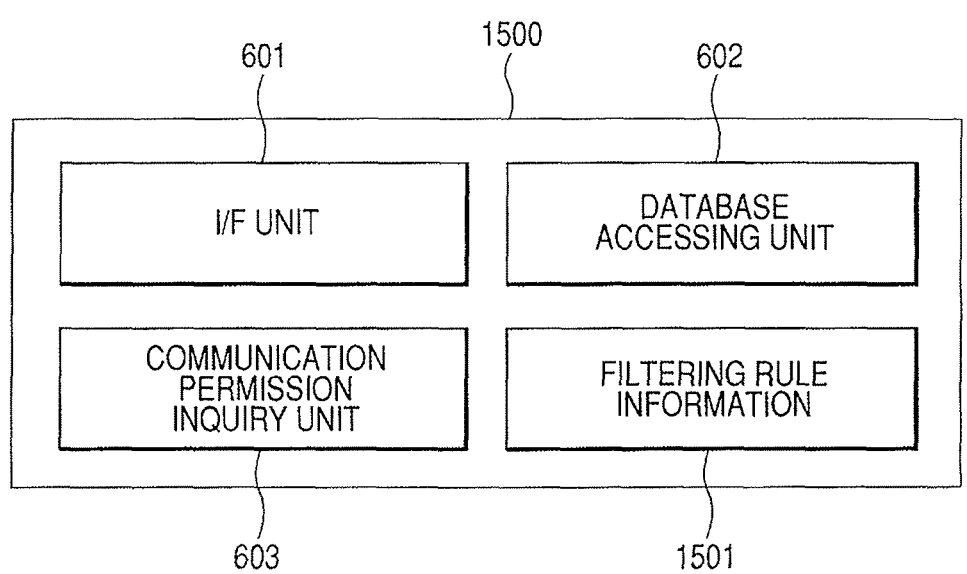
FIG. 15 is a block diagram showing a fundamental functional construction of a gateway in the third embodiment of the invention.
Figure 16:
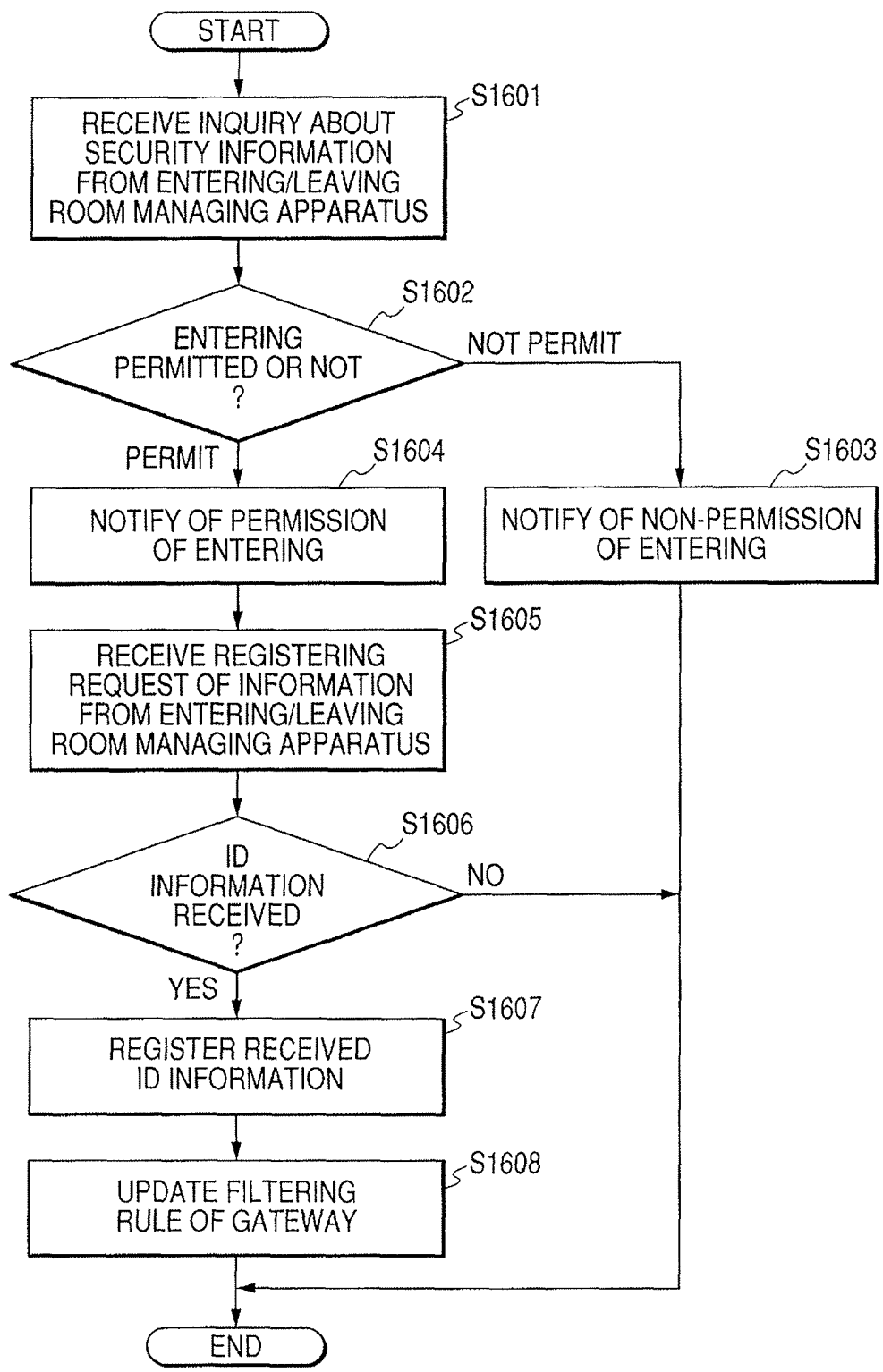
FIG. 16 is a flowchart showing the entering/leaving room process by the managing server 108.

FIG. 15 is a block diagram showing a fundamental functional construction of a gateway in the third embodiment of the invention. FIG. 16 is a flowchart showing the entering/leaving room process by the managing server 108 according to the third embodiment of the invention. This process is executed by the cooperative operation of the I/F unit 604, database search unit 605, and communication permission discriminating unit 606.

In FIG. 15, a gateway 1500 has filtering rule information 1501 in addition to the I/F unit 601, database accessing unit 602, and communication permission inquiry unit 603.

In FIG. 16, when an inquiry about the security information is received from the entering/leaving room managing apparatus 106 (step S1601), the managing server 108 discriminates whether or not the entering is permitted (step S1602). In this instance, when the user 103 requests the entering into the security area 101, the user ID read out by the entering/leaving room managing apparatus 106 from the ID card 104 carried by the user 103 is received as security information.

The managing server 108 searches for the user ID from the ID managing area 801 in the network connection permission table. If the user ID received as security information is not registered in the ID managing area 801, the entering/leaving room managing apparatus 106 is notified of not-permission of the entering (step S1603) and the present processing routine is finished.

If the entering is permitted as a discrimination result of step S1602, that is, the user ID received as security information has been registered in the ID managing area 801, the entering/leaving room managing apparatus 106 is notified of permission of the entering (step S1604). When the notification of the permission of the entering is received from the managing server 108, the entering/leaving room managing apparatus 106 transmits the ID information, as a registering request, of the notebook computer 102 to be registered into the managing server 108 to the managing server 108.

Subsequently, the managing server 108 receives the registering request of the ID information from the entering/leaving room managing apparatus 106 (step S1605) and discriminates whether or not the ID information has been received. In this instance, in order to discriminate whether or not the user 103 has carried the communicating terminal such as a notebook computer 102 or the like when he enters the security area 101, the entering/leaving room managing apparatus 106 reads out the ID information (for example, MAC address, IP address, etc.) of the notebook computer 102 from the contactless IC in the notebook computer 102 and reads out the ID information regarding the notebook computer 102 from the contactless IC in the ID card 104. If those ID information coincides, it is determined that the user 103 has carried the communicating terminal, so that the managing server 108 is notified of the ID information. When the managing server 108 receives the ID information from the entering/leaving room managing apparatus 106, the processing routine advances to step S1607.

If the user 103 does not carry the communicating terminal such as a notebook computer 102 or the like when he enters the security area 101, since the entering/leaving room managing apparatus 106 does not notify the managing server 108 of the ID information of the communicating terminal, the present processing routine is finished.

The managing server 108 registers the ID information received from the entering/leaving room managing apparatus 106 (step S1607). In this instance, the received MAC address, IP address, or the like is registered as ID information into the entering room managing area 802 or 1302 in the network connection permission table. When the ID information is newly registered, the managing server 108 notifies the gateway 109 that the ID information has been registered.

When such a notification is received from the managing server 108, the gateway 109 registers the newly-registered ID information into the filtering rule information 1501 and updates the filtering rule (step S1608), and the present processing routine is finished.

According to the third embodiment mentioned above, by holding the newly-registered MAC address, IP address, or the like of the communicating terminal into the filtering rule information 1501 of the gateway 109, for example, when the notebook computer 102 is connected to the network 107 and transmits the data packet, the MAC address or the IP address in the data packet is verified by the gateway 109, and only when the MAC address or the IP address coincides with that held in the filtering rule information 1501, the packet is enabled to be transmitted and received between the networks. Therefore, the gateway 109 does not inquire of the managing server 108 every packet but can execute the transmission and reception of the packet at a high speed.

Although the managing server 108 and the gateway 109 are separately arranged in the first to third embodiments, only the managing server 108 (or gateway 109) in which their functions are integrated can be also arranged. The processes which are executed by the managing server 108 can be executed by the gateway 109, or the processes which are executed by the gateway 109 can be also executed by the managing server 108.

In the first to third embodiments, if the reading of the security information and the reading of the ID information are not executed at timing within a predetermined time, it is also possible to control in such a manner that the ID information of the notebook computer 102 is not registered into the network connection permission table. For example, in step S707 in FIG. 8, step S1207 in FIG. 12, and step S1607 in FIG. 16, there is also presumed a construction in which if a time interval between the timing for the user authentication and the timing for inputting the ID information of the information processing apparatus does not lie within about a predetermined time (for example, within 30 seconds), the registration of the ID information of the information processing apparatus into the managing server 108 is restricted. By this method, the security of the system can be improved. It is also possible to use a construction in which, in the first to third embodiments, when the notebook computer 102 in which the ID information is not registered or the ID information has been deleted accesses the network, the data packet is not transferred but a warning message is displayed to the notebook computer 102.

Fourth Embodiment

Although the user ID to identify the user 103 recorded in the contactless IC has been described as an example of the security information in the first to third embodiments, as further another application example, organism information which is read out of the body of the user can be also used as a user ID.

As organism information, for example, information such as fingerprint information, voiceprint information, cornea information, audio information, and the like by which each user can be individually identified can be mentioned. In this case, the organism information is read out by the entering/leaving room managing apparatus 106 in step S702 in FIG. 7 and the user authentication based on the read-out organism information is made by the entering/leaving room managing apparatus 106 or the managing server 108. Since processes after the user authenticating process based on the organism information was executed in step S705 in FIG. 8, step S1205 in FIG. 12, and step S1602 in FIG. 16 are similar to those in the first to third embodiments, their detailed explanation is omitted here.

Further, in place of the organism information, it is also possible to input a password through input means such as keyboard, touch panel liquid crystal, or the like and use the inputted password as security information described in the first to third embodiments. Also in this case, since processes after the user authenticating process based on the inputted password was executed in step S705 in FIG. 8, step S1205 in FIG. 12, and step S1602 in FIG. 16 are similar to those in the first to third embodiments, their detailed explanation is omitted here.

The object of the invention can be also accomplished by a method whereby a storing medium in which program codes of software to realize the functions of the embodiments mentioned above have been recorded is supplied to a system or an apparatus and a computer (or a CPU, an MPU, or the like) of the system or apparatus reads out and executes the program codes stored in the storing medium.

In this case, the program codes themselves read out of the storing medium realize the functions of the embodiments mentioned above. The storing medium in which the program codes have been stored constructs the invention.

As a storing medium for supplying the program codes, for example, a floppy (registered trademark) disk, a hard disk, a magnetooptic disk, a CD-ROM, a CD-R, a CD-RW, a DVD-ROM, a DVD-RAM, a DVD-RW, a DVD+RW, a magnetic tape, a non-volatile memory card, a ROM, or the like can be used.

The invention incorporates not only a case where the computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes.

Further, the invention also incorporates a case where the program codes read out of the storing medium are written into a memory provided for a function expanding board inserted in the computer or a function expanding unit connected to the computer, and thereafter, a CPU or the like provided for the function expanding board or the function expanding unit executes a part or all of actual processes on the basis of instructions of the program codes, and the functions of the embodiments mentioned above are realized by those processes.

This application claims priority from Japanese Patent Application No. 2004-314215 filed on Oct. 28, 2004, which is hereby incorporated by reference herein.

The invention claimed is:

1. A network system comprising:
   a reading apparatus for reading user identification information of a user;
   a first management apparatus for managing the user identification information read by the reading apparatus; and
   a second management apparatus for managing at least one communicating terminal which can communicate with a network,
   wherein the first management apparatus comprises a discrimination unit adapted to discriminate, based on the user identification information of the user read by the reading apparatus, before the user enters a certain area, whether an entrance of the certain area is to be locked or unlocked so as to permit or not to permit the user to enter the certain area, and
   wherein the second management apparatus comprises:
   (a) a first reception unit adapted to receive the user identification information of the user from the first management apparatus;
   (b) a second reception unit adapted to receive terminal identification information of one of the at least one communicating terminal from the one communicating terminal;
   (c) a registration unit adapted to register, in a management table, the terminal identification information of the one communicating terminal received by the second reception unit in correspondence to the user identification information of the user, if the discrimination unit discriminates that the user is permitted to enter the certain area;
   (d) a deletion unit adapted to delete the terminal identification information from the management table, if the reading apparatus reads the user identification information of the user when the user is to leave the certain area; and
   (e) a control unit adapted to control the communication between the one communicating terminal and the network on the basis of a registration situation of the terminal identification information in the management table such that the communication is permitted while the terminal identification information is registered in the management table and the communication is not permitted while the terminal identification information is not registered in the management table.

2. A system according to claim 1, wherein the deletion unit deletes from the management table the terminal identification information corresponding to the user identification information of the user, if the reading apparatus reads the user identification information of the user when the user is to leave the certain area.

3. A system according to claim 1, wherein when the communication is not executed for a predetermined time, the deletion unit deletes the terminal identification information from the management table.

4. A system according to claim 1, wherein the reading apparatus reads the terminal identification information, and the second reception unit receives the terminal identification information read by the reading apparatus.

5. A system according to claim 1, further comprising an issuing unit adapted to issue an IP address to the one communicating terminal, if the discrimination unit discriminates that the user is permitted to enter the certain area.

6. A system according to claim 1, further comprising an unlocking unit adapted to unlock a door to the area, if the discrimination unit discriminates that the user is permitted to enter the certain area.

7. A system according to claim 1, further comprising a warning unit adapted to keep a door to the area locked and to produce a warning message, if the discrimination unit discriminates that the user is not permitted to enter the certain area.

8. A system according to claim 1, wherein the terminal identification information comprises a MAC address.

9. A system according to claim 1, wherein the reading apparatus reads the user identification information in a contactless manner.

10. A system according to claim 9, wherein the reading apparatus reads the user identification information from an ID card or a cellular phone.

11. A control method for a network system comprising (a) a reading apparatus for reading user identification information of a user, (b) a first management apparatus for managing the user identification information read by the reading apparatus, and (c) a second management apparatus for managing at least one communicating terminal which can communicate with a network, the control method comprising:
   a discrimination step of discriminating, by the first management apparatus, based on the user identification information of the user read by the reading apparatus, before the user enters a certain area, whether an entrance of the certain area is to be locked or unlocked so as to permit or not to permit the user to enter the certain area;
   a first reception step of receiving, by the second management apparatus, the user identification information of the user from the first management apparatus;
   a second reception step of receiving, by the second management apparatus, terminal identification information of one of the at least one communicating terminal from the one communicating terminal;
   a registration step of registering, by the second management apparatus, in a management table, the terminal identification information of the one communicating terminal received by the second reception step in correspondence to the user identification information of the user, if the discrimination step discriminates that the user is permitted to enter the certain area;
   a deletion step of deleting, by the second management apparatus, the terminal identification information from the management table, if the reading apparatus reads the user identification information of the user when the user is to leave the certain area; and
   a control step of controlling, by the second management apparatus, the communication between the one communicating terminal and the network on the basis of a registration situation of the terminal identification information in the management table, such that the communication is permitted while the terminal identification information is registered in the management table and the communication is not permitted while the terminal identification information is not registered in the management table.

12. A non-transitory computer-readable storage medium storing a computer program that causes a computer to execute a control method for a network system comprising (a) a reading apparatus for reading user identification information of a user, (b) a first management apparatus for managing the user identification information read by the reading apparatus, and (c) a second management apparatus for managing at least one communicating terminal which can communicate with a network, the control method comprising:

- a discrimination step of discriminating, by the first management apparatus, based on the user identification information of the user read by the reading apparatus, before the user enters a certain area, whether an entrance of the certain area is to be locked or unlocked so as to permit or not to permit the user to enter the certain area;
- a first reception step of receiving, by the second management apparatus, the user identification information of the user from the first management apparatus;
- a second reception step of receiving, by the second management apparatus, terminal identification information of one of the at least one communicating terminal from the one communicating terminal;
- a registration step of registering, by the second management apparatus, in a management table, the terminal identification information of the one communicating terminal received by the second reception step in correspondence to the user identification information of the user, if the discrimination step discriminates that the user is permitted to enter the certain area;
- a deletion step of deleting, by the second management apparatus, the terminal identification information from the management table, if the reading apparatus reads the user identification information of the user when the user is to leave the certain area; and
- a control step of controlling, by the second management apparatus, the communication between the one communicating terminal and the network on the basis of a registration situation of the terminal identification information in the management table, such that the communication is permitted while the terminal identification information is registered in the management table and the communication is not permitted while the terminal identification information is not registered in the management table.

* * * * *